Figure 1:
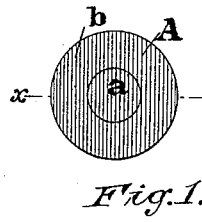

(Model.)

E. V. CLEMENS.
BOTTLE SEAL STOPPER.

No. 461,258. Patented Oct. 13, 1891.

Attest:
C. M. Benjamin
Owen H. Hughes

Inventor:
Ernest V. Clemens

UNITED STATES PATENT OFFICE.

ERNEST V. CLEMENS, OF NEW YORK, N. Y., ASSIGNOR TO THE DE LA VERGNE BOTTLE AND SEAL COMPANY, OF NEW JERSEY.

BOTTLE-SEAL STOPPER.

SPECIFICATION forming part of Letters Patent No. 461,258, dated October 13, 1891.

Application filed May 8, 1891. Serial No. 392,121. (Model.)

*To all whom it may concern:*

Be it known that I, ERNEST V. CLEMENS, a citizen of the United States, and a resident of the city of New York, in the county and State of New York, have invented certain new and useful Improvements in Bottle-Seal Stoppers, of which the following is such a full, clear, concise, and exact description as will enable others skilled in the art to which my invention appertains to make and use the same, reference being had to the accompanying drawings, forming part of this specification.

The invention relates especially to that class of elastic and compressible stoppers called "bottle-seals," which, on account of their simplicity, have given greater satisfaction than other and more complicated stoppering devices. A bottle-seal stopper to be efficient has its column normally of greater diameter than the bottle-neck aperture, into which it is insertible by contractile compression. The contraction has heretofore taken place during the forcing of the seal through the tapering tube or throat of a corking-machine, by means of which it is delivered to and seated in the neck of a bottle, being externally removable therefrom whenever the contents are desired for use. After the stopper is inserted the expansive force of the material causes it to exert a pressure against the sides of the bottle-neck, so as to overcome the tendency of the pressure of the gas from within to expel the stopper. The elastic and compressible stopper or seal as first made and used in a conical recess in the bottle-neck produced a tightening-joint, to the maintenance of which the pressure of the gas within the bottle contributed, and such combination had the further effect of dispensing with the necessity of outside fastenings or wire attachments for holding the stopper in place. Seal-stoppers are cheap to manufacture and would fulfill the essential conditions of a very superior stopper were it not for the trouble, which from the outset was experienced, in withdrawing them from the bottle. In view of this difficulty several impractical suggestions or proposals were made concerning the manner in which the withdrawal might be effected, and continued experiments to overcome the objection led to the use of certain devices in the nature of pull-wires attached to the seals; but even with such additions an extracting tool or instrument was required to withdraw the stopper from a bottle. The introduction of pull-wires added to the cost of manufacture and was attended with other objectionable features, which became known from actual use of seals provided with them. Pull-wires interfered with equable compression and free expansion of the seal during and after insertion in a bottle, and consequently with the tightness of the joint, which in bottles containing liquids highly charged with gas or beer subjected to the steaming process should be as perfect as possible. Moreover, pull-wires passed through the stoppers and exposed the metal to the action of the liquids or gases, and the corrosion or rusting thus occasioned extended up into the body or inferior material of the seal. This corrosion, besides being detrimental to the liquids, gave rise to a liability of leakage or escape of gas in addition to such liability by reason of imperfect compression around the wire or the several parts which in certain formations thereof penetrated the body of the seal. Again, the pull-wires sometimes broke or tore through the material and came out of the seal without extracting it.

The primary object of the present invention is to produce a seal-stopper having the advantage of easy extraction in addition to the efficacy and simplicity of those heretofore made, while being free from the objectionable features previously present or introduced.

The improvement in so far as it constitutes the subject-matter hereof consists, first, of an elastic seal-stopper having the diameter of its column greater than the bottle-neck aperture into which it is insertible by contractile compression, said stopper having as a component part of its body a displaceable plug or portion, whereby relief from the compressure may be afforded during extraction of the stopper from a bottle; second, of a stopper of the same inherent and structural characteristics, in which, however, the displaceable plug or portion is formed integrant with and attached to the body thereof, and, third, of a stopper of the same inherent and structural characteristics in which the displaceable plug or portion is tapering and formed integrant with and attached to the body thereof, all as hereinafter more fully described, and pointed out in the claims.

In the accompanying drawings, A represents the seal-stopper, $a$ the plug therein, and $b$ the outer portion of the body which surrounds the plug, while $c$ represents the hinge or unsevered portion in the figures which delineate such a construction, and D represents the bottle, having a conical recess $d$ in its neck.

Figure 2:
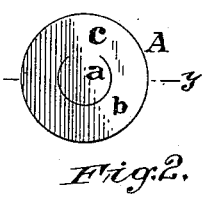
Figure 3:
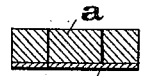
Figure 4:
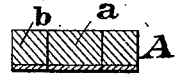
Figure 5:
Figure 6:
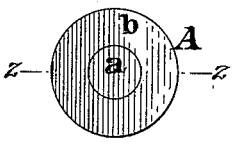
Figure 7:
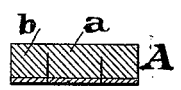
Figure 8:
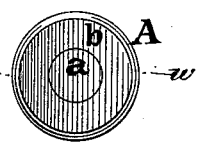
Figure 9:
Figure 10:
Figure 11:
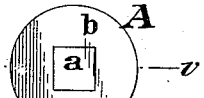
Figure 12:
Figure 13:
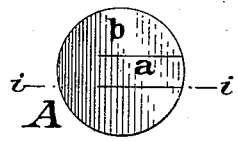
Figure 14:
Figures 15, 16:
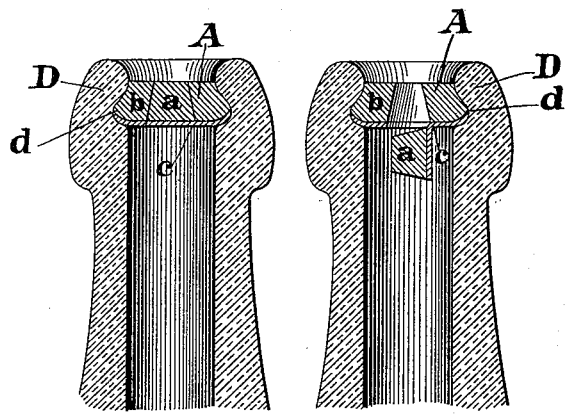

In the drawings, Figure 1 is a top plan view of a bottle-seal having a cylindrical plug formed integrant with and attached to the body thereof by a hinge $c$, as shown in Fig. 2, which is a bottom plan of the same; and Fig. 3 is a central vertical section of the same form of a seal, taken on the line $x\ x$ of Fig. 1 and $y\ y$ of Fig. 2. Fig. 4 is a central vertical section of a seal, taken on the line $x\ x$ of Fig. 1, showing the plug as being separated from the body of the seal, although forming a component part thereof. Fig. 5 is a central vertical section on the line $x\ x$ of Fig. 1, showing a seal having a cylindrical plug where no portion of the incision by which it is formed extends entirely through the body. Fig. 6 is a bottom plan view of a seal having a similarly-formed plug made by an incision from the under side, which extends upwardly from the bottom to a point near the top of the body, as more clearly shown by Fig. 7, which is a central vertical section thereof, taken on the line $z\ z$ of Fig. 6. Fig. 8 is a top plan view of a conical bottle-seal having a conical plug therein, formed integrant with and attached to the body thereof by a hinge or unsevered portion, the bottom plan of which would be similar to Fig. 2. Fig. 9 is a central vertical section of the seal shown by Fig. 8, taken on the line $w\ w$ of that figure. Fig. 10 is a like vertical section of a conical seal having a conical plug the latter being separate from the body of the seal. Fig. 11 is a top plan view of a seal having a four-cornered or square plug attached to the body thereof by a hinge or unsevered portion, as shown in Fig. 12, which is a central vertical section thereof taken on the line $v\ v$ of Fig. 11. Fig. 13 is a top plan view of a seal having an equivalent of the plug in the form of an elongated portion made by parallel incisions extending outwardly in one direction to and cutting the periphery of the seal, and Fig. 14 is a vertical section thereof on the line $i\ i$ of Fig. 13. Fig. 15 is a central vertical section of a bottle-neck having a conical recess with an upwardly-converging peripheral wall and of a seal therein having a plug formed integrant with and attached to the body thereof by a hinge or unsevered portion, while Fig. 16 shows the same with the plug displaced and hanging by the hinge. The displacement of the plug represented in the last-mentioned figure takes place in practice by pushing against the same with an ordinary extracting-tool or other instrument, the end of which on effecting the displacement would be in the opening or hole in the seal, and by a prying movement the extracting-tool would tip the seal upward, while the sides thereof collapse in passing through the aperture in the bottle-neck, from which it would then be lifted out with ease.

In practice my improved seal-stopper is of greater diameter than the bottle-neck or aperture into which it is inserted, and may be composed either wholly or partially of elastic and compressible material; but in any event the surrounding portion of its body should have sufficient compressibility to permit the contraction necessary to its insertion into the bottle-neck and sufficient elasticity to cause expansion or force against the sides of the same. The plug or its equivalent, being a component part of the body of the seal, may be of elastic and compressible material or of a different character, as wood, metal, or composition, and when formed separately occupies an orifice adapted to receive it. Such formations, which are illustrated by Figs. 4 and 10, are not regarded as so desirable for the reason that when displaced the plug is liable to drop into the bottle, and would of course have to be removed from the contents when poured out. The plug may remain attached to the body by an unsevered portion, as shown by Figs. 5, 6, and 7, as may also equivalent formations, examples of which are shown by Figs. 13 and 14, and in such cases they are intended to be broken away during the act of displacement. The plug is preferably integrant with and attached to the body of the seal, as such formation is more desirable for use and more economical to manufacture and may be effected by the same machine that cuts the seal out of the material.

It being a practice to isolate the upper portion or cheaper grade of material by attaching to the under surface thereof a fine quality of waterproofed sheeting, the latter serves the purpose of leaving the plug attached to the seal by a hinge, as $c$, formed by having the incision extend all the way through the material and leaving the under cut incomplete, so that a portion of the sheeting remains unsevered. When the hinge formation is used, the plug may be displaced by being pushed through the seal and made to swing thereunder until it is out of the way of the extracting-instrument, which removes the whole stopper from the bottle.

It is obvious that the plug may be of any conformation, and for the purpose of illustrating several forms and equivalents thereof it is shown in the drawings as cylindrical, conical, and four-sided; but may of course be triangular, diamond form, star-shaped, or of other configuration, and the equivalents thereof may be elongations or other displaceable portions composing parts of the body—as, for example, the structure shown by Figs.

13 and 14. The cylindrical and conical forms of plug are, however, deemed best, as they are simple and when displaced leave a circular opening, which by reason of its regularity and correspondence with the peripheral wall of the bottle-neck are especially adapted to permit the desired relief from the compressure during the extraction of the stopper from a bottle. Moreover, a conical plug being easily displaced in the direction of the enlargement of the aperture occupied by it in the seal is in that respect more desirable than other forms. This ease of displacement is a feature of the seal in all cases of its use if the plug is originally made conical. The same result may, however, be practically effected by making a cylindrical seal with a cylindrical plug of compressible material for use in a bottle having a conical form of recess in its neck. When inserted in such bottle-neck, the seal and its plug would be forced to conform to the convergence of the recess, which, being in an upward direction, would cause them to contract more at the top than at the bottom. The displacement of the plug could then be effected by passing it downwardly through the enlarged portion of the aperture produced by less compression and resistance toward the bottom of the recess and seal. In such connection the cylindrical plug would be the equivalent of the originally-formed conical plug, and in claiming such conical form I wish to be understood as also claiming its equivalents.

By the use of a stopper provided with a plug or displaceable portion in a bottle-neck the contractile compression has the effect of making a tight joint around the plug, as well as with the bottle, and if the bottle has a conical recess the tendency of the pressure of the gas from within the bottle to expel the stopper therefrom is overcome by the convergence or stricture in the neck, which, besides preventing expulsion, is calculated to cause greater tightness of the stopper in the bottle and greater tightness of the plug in the stopper. Moreover, a stopper having a displaceable plug as a component part of its body when subjected to contractile compression is practically as solid and tight in the bottle as if the continuity throughout the stopper were uninterrupted, and consequently it posesses the efficacy and simplicity heretofore found to be desirable.

The construction of a bottle-seal stopper with a plug in its body not only affords accessibility to the stopper when it is desired to extract it from a bottle, but also relief from the compressure, which, though very desirable, has heretofore been unattainable during extraction. The operation of withdrawing the stopper consists merely in taking one of the ordinary extracting-tools already in use in connection with seal-stoppers provided with pull-wires, or any other suitable instrument, when by removing the plug the stopper is relieved from the central pressure and readily collapses as it is tipped up or drawn out through the mouth of the bottle.

I do not herein claim the combination of a bottle having in the neck thereof a recess with an upwardly-converging peripheral wall and a stopper of the inherent and structural characteristics above described, as the same is made the subject of another application for a patent thereon, filed by me on the date of the filing of these presents and bearing Serial No. 392,122; but,

Having thus described my invention, what I do herein claim as new, and desire to secure by Letters Patent, is—

1. An elastic seal-stopper having as a component part of its body and integrant therewith a displaceable plug or portion, whereby relief from the compressure may be afforded during the extraction of the stopper from a bottle.

2. An elastic seal-stopper having a displaceable plug or portion formed integrant with and attached to the body thereof, whereby relief from the compressure may be afforded during extraction of the stopper from a bottle.

3. An elastic seal-stopper having a displaceable tapering plug or portion formed integrant with and attached to the body thereof, whereby relief from the compressure may be afforded during extraction of the stopper from a bottle.

ERNEST V. CLEMENS.

Witnesses:
HUBERT A. BANNING,
OWEN V. HUGHES.